UNITED STATES PATENT OFFICE.

JAMES J. JOHNSTON, OF COLUMBIANA, OHIO, ASSIGNOR TO S. D. HUBBARD & CO., OF PITTSBURG, PENNSYLVANIA.

IMPROVEMENT IN PUDDLING IRON.

Specification forming part of Letters Patent No. 126,710, dated May 14, 1872.

*To all whom it may concern:*

Be it known that I, JAMES J. JOHNSTON, of Columbiana, in the county of Columbiana and State of Ohio, have invented a certain new and useful Improvement in the Process of Manufacturing Iron; and I do hereby declare that the following is a full, clear, and exact description thereof.

The nature of my invention consists in mixing pulverized and heated iron ore with the molten iron in the puddling-furnace during the process of boiling or puddling iron.

To enable others skilled in the art of manufacturing iron to use my invention, I will proceed to describe more fully my process of preparing and mixing the ore with the molten iron in the puddling-furnace.

I take a good article of iron ore and pulverize it, so that it will pass through a No. 8 or No. 16 sieve. I then heat the pulverized ore to about 600° Fahrenheit, and when the iron is in its most fluid condition in the puddling-furnace I lower the damper of the furnace-stack. I then mix with the molten metal in the furnace from ten to thirty per cent. of the pulverized and heated iron ore, adding it gradually to the molten iron, taking care to mix it in and thoroughly through the molten iron by a rapid and vigorous stirring process. After the iron "comes to nature," it is made into balls, then subjected to the action of the squeezer or hammer, and worked into merchantable bar iron in the usual manner and by the ordinary means.

It will be an advantage to let the balls, after they are formed in the furnace, be subjected to a "sweating process" for a short time. After the ore has been thoroughly mixed with the molten iron in the furnace the damper of the stack may be raised, and the furnace and iron manipulated in the usual manner.

The black oxide of manganese, soda, and other ingredients, may be mixed with the pulverized iron ore prior to heating it and mixing it with molten iron. As I propose making this the subject of another application for Letters Patent I will not further describe such combinations in this application.

I am aware that heated and pulverized iron ore has been used in blast-furnaces; therefore I do not claim, broadly, the use of pulverized and heated iron ore; neither do I claim the use of pulverized and heated iron ore, mixed with molten iron, outside of the puddling furnace, for such use of the pulverized and heated iron ore is described in a former application for Letters Patent made by me, and for which a patent is about to be issued.

Having thus described my invention, what I claim as new is—

In the process of "boiling" or puddling iron in a furnace, mixing pulverized and heated iron ore with the molten iron, substantially as herein described.

JAMES J. JOHNSTON.

Witnesses:
J. C. WILDMAN,
JNO. D. PATTEN.